United States Patent [19]

Curtis et al.

[11] Patent Number: 4,626,836

[45] Date of Patent: Dec. 2, 1986

[54] METHOD OF SCHEDULING MEETINGS

[75] Inventors: Donald E. Curtis, Garland; James P. Vincent, Arlington; Mary E. Weidmann, Irving, all of Tex.

[73] Assignee: International Business Machines Corp., Armonk, N.Y.

[21] Appl. No.: 548,609

[22] Filed: Nov. 4, 1983

[51] Int. Cl.⁴ .............................................. G04S 47/00
[52] U.S. Cl. ...................................... 340/706; 40/107; 340/700; 368/41
[58] Field of Search ........................ 340/700, 706, 711; 40/107; 364/401, 402, 407; 368/41, 10

[56] References Cited

U.S. PATENT DOCUMENTS

| | | | |
|---|---|---|---|
| 3,964,195 | 6/1976 | Jordan | 40/107 |
| 4,162,610 | 7/1979 | Levine | 368/41 |
| 4,430,639 | 2/1984 | Bennett | 340/310 A |
| 4,449,186 | 5/1984 | Kelly | 364/407 |
| 4,548,510 | 10/1985 | Levine | 368/41 |

OTHER PUBLICATIONS

Marsplus Operator's Manual from ITT Electronic Travel Services.

Primary Examiner—John W. Caldwell, Sr.
Assistant Examiner—Michael F. Heim
Attorney, Agent, or Firm—C. Lamont Whitham; James H. Barksdale

[57] ABSTRACT

A method of scheduling a meeting among terminal users who are provided with calendaring applications for storing and retrieving timed and dated events. Included is presentation to a meeting scheduler of a prompting screen with blanks for keying in desired times and dates, and prospective attendees. Based on keying to this screen, there is a comparison with the prospective attendees' calendars of events. The result of the comparison is an option list which is presented to the scheduler for selecting an available meeting time. Based on a selection from the option list, a meeting notification screen is built for transmitting to the attendees.

6 Claims, 6 Drawing Figures

```
1:..+...10....+...20....+...30....+...40....+...50....+...60....+...70....+...80
                              SCHEDULE A MEETING

Type in the information below.

Search from this date:  9 /  7 / 83
     To this date:           9 /  9 / 83
     Amount of time needed: Hours  2 Minutes 30

Check the following schedules.  Type one conference room name and/or
     user name per space.  When you have finished, press ENTER.
     Johnson_____    Smith_____
     Riley_____    Conference Room A22_____
     _____    _____
     _____    _____
     _____    _____
     _____    _____
     _____    _____
     _____    _____
     _____    _____
     _____    _____
     _____    _____

PF9 Help    PF12 Return
   1...+...10....+...20....+...30....+...40....+...50....+...60....+...70....+...80
```

FIG.1

```
1...+...10....+...20....+...30....+...40....+...50....+...60....+...70....+...80
                         SCHEDULE A MEETING

Type in the information below.

Search from this date:  9 / 7 / 83
   To this date:           9 / 9 / 83
   Amount of time needed: Hours  2 Minutes 30

Check the following schedules.  Type one conference room name and/or
   user name per space.  When you have finished, press ENTER.
   Johnson_____  Smith_____
   Riley_____   Conference Room A22_____
   _____   _____
   _____   _____
   _____   _____
   _____   _____
   _____   _____
   _____   _____
   _____   _____
   _____   _____

PF9 Help    PF12 Return
1...+...10....+...20....+...30....+...40....+...50....+...60....+...70....+...80
```

FIG. 2

```
     1...+...10....+...20....+...30....+...40....+...50....+...60....+...70....+...80
 1|                        TIMES FOUND FOR A MEETING
 2|
 3| Searched from this date: 09/07/83
 4| To this date:            09/09/83
 5| Amount of time needed: Hours  2 Minutes 30
 6|
 7| To choose a day and time, type X next to your choice below,
 8| change the starting and ending times as required and press ENTER.
 9|
10|   CHOICE    DAY          DATE         STARTING    ENDING
11|     _      Wednesday    09/07/83       9:00 AM    12:00 PM
12|     _      Wednesday    09/07/83       1:30 AM     5:00 PM
13|     _      Thursday     09/08/83      10:30 AM     6:00 PM
14|     _      Friday       09/09/83       8:30 AM    11:45 AM
15|     _      Friday       09/09/83       2:00 PM     5:15 PM
16|
17|
18|
19|
20|
21|
22|
23|                                                    Screen    1 of  1
24| PF1 Try Another  PF9 Help  PF10 Next Screen  PF11 Previous Screen  PF12 Return
     1...+...10....+...20....+...30....+...40....+...50....+...60....+...70....+...80
```

FIG. 3

```
   1...+...10....+...20....+...30....+...40....+...50....+...60....+...70....+...80
 1                        SEND A NOTICE OF A MEETING
 2
 3  Date to be scheduled:  9/ 9/83
 4  Starting time:         2:00 PM
 5  Ending time:           4:30 PM
 6
 7  Type in the information below.  Then, press PF7 to send.
 8
 9  Location:    Third floor conference room (3-F-13)_____
10  _____
11
12  Purpose:     We need to review that January sales report to see if we need a__
13               new approach for our forthcoming product.  Please bring your ____
14               monthly reports for the last year, and the forcast for this ___.
15               year._____
16           _____
17           _____
18           _____
19           _____
20
21
22
23
24  PF1 Try Another    PF2 Change Time    PF7 Send    PF9 Help    PF12 Return
   1...+...10....+...20....+...30....+...40....+...50....+...60....+...70....+...80
```

METHOD OF SCHEDULING MEETINGS

CROSS-REFERENCE TO RELATED APPLICATIONS

U.S. patent application Ser. No. 487,375, filed Apr. 21, 1983, entitled ANNOTATED CALENDAR ASSEMBLY, and having J. P. Vincent et al. as inventors.

U.S. patent application Ser. No. 548,609, filed Nov. 4, 1983, entitled CALENDAR EVENT DESCRIPTION ABBREVIATION, and having D. E. Curtis et al. as inventors.

TECHNICAL FIELD

This invention relates generally to meeting scheduling, and more specifically to imparting flexibility to the tasks of scheduling of a meeting and notifying attendees.

BACKGROUND ART

Scheduling of meetings has always been fraught with problems. This is particularly the case when one scheduling a meeting, or meeting scheduler, has no management or other control over those whose attendance is either desired or necessary.

The prior art initially eased the scheduling burden in that keyboard/display terminal users' schedules were stored in varying calendar forms, and all could be made available for call up at each terminal. These schedules could be called and scanned to determine common available times. This was extremely time consuming if schedules were only available in narrative form on a day-at-a-time basis. Even when monthly abbreviated schedules or calendars were available for call-up, mental or pencil and paper notation of available times was both error prone and no minor chore.

The prior art has now gone further in solving the above noted problems. Calendar application programs, stored in a host computer to which the terminal users are connected, are able to read calendars of prospective attendees and provide a listing of available meeting times and dates. The available times and dates are derived from date and time ranges provided by the scheduler. From this listing, a meeting scheduler can select a suitable time and date. After making a selection, and either writing down or making a mental note of the suitable time and date, the meeting scheduler can key and transmit a message to each attendee. Still required though, is excessive keying in terms of rekeying attendees names, and a meeting time and date.

The invention of this application presents advances over known art or work of others in that available meeting times and dates are presented to the meeting scheduler as an option screen. The option screen is keyed to in order to select a time and date for the meeting. Upon selecting from the option screen, a notification screen is presented to the scheduler. Keying to the notification screen is to fill in the purpose and location of the meeting, and if appropriate, to shorten the duration of the meeting. Upon completing the notification screen, the screen is transmitted to notify all attendees of the meeting. The advantages of these advances are time savings, error reduction, and reduced keying requirements. In addition, the user scheduling the meeting does not have to be concerned with exact beginning and ending times for the meeting during the initial steps of setting up the meeting.

DISCLOSURE OF THE INVENTION

A unique method of scheduling a meeting among keyboard/display terminal users is provided in order to impart flexibility to the process of, and reduce the time normally expended in, arranging a meeting and notifying attendees.

The method utilizes users' daily schedules which are built by keying in a date, a start time, an end time, and information related to the keyed in time such as an event description. The daily schedules are called as screens by the users to remind them of coming events. First included in the method is presentation of a prompting screen to a user desiring to schedule a meeting. The screen includes blanks to be filled in by keying. To be keyed in the blanks are a range of acceptable dates, a meeting time duration preference, and prospective attendees. Upon completion of keying, the screen contents are compared with the prospective attendees' daily schedules. This comparison is to ascertain times when all prospective attendees have no scheduled event. As a result of the comparison, a list of available times and dates for the meeting is compiled. The list is presented to the user as a number of options from which a time can be selected.

Once an appropriate date and time have been chosen from the option list, a notification screen is presented to the user scheduling the meeting, prompting the user to key in the location and purpose of the meeting. Thereafter, a meeting notification, listing date, time, location, purpose, and scheduler, is transmitted and displayed to each attendee.

BRIEF DESCRIPTION OF THE DRAWING

FIG. 1 is a pictorial representation ot a prompting screen which is presented to a meeting scheduler at the beginning of the scheduling method of this invention.

FIG. 2 is a pictorial representation of an option list screen resulting from a comparison of the contents of a filled-in screen of FIG. 1 with prospective meeting attendees' schedules.

FIG. 3 is a pictorial representation of a meeting notification screen, part of which is filled in based on a selection from the option screen of FIG. 2.

BEST MODE FOR CARRYING OUT THE INVENTION

Figure 4:
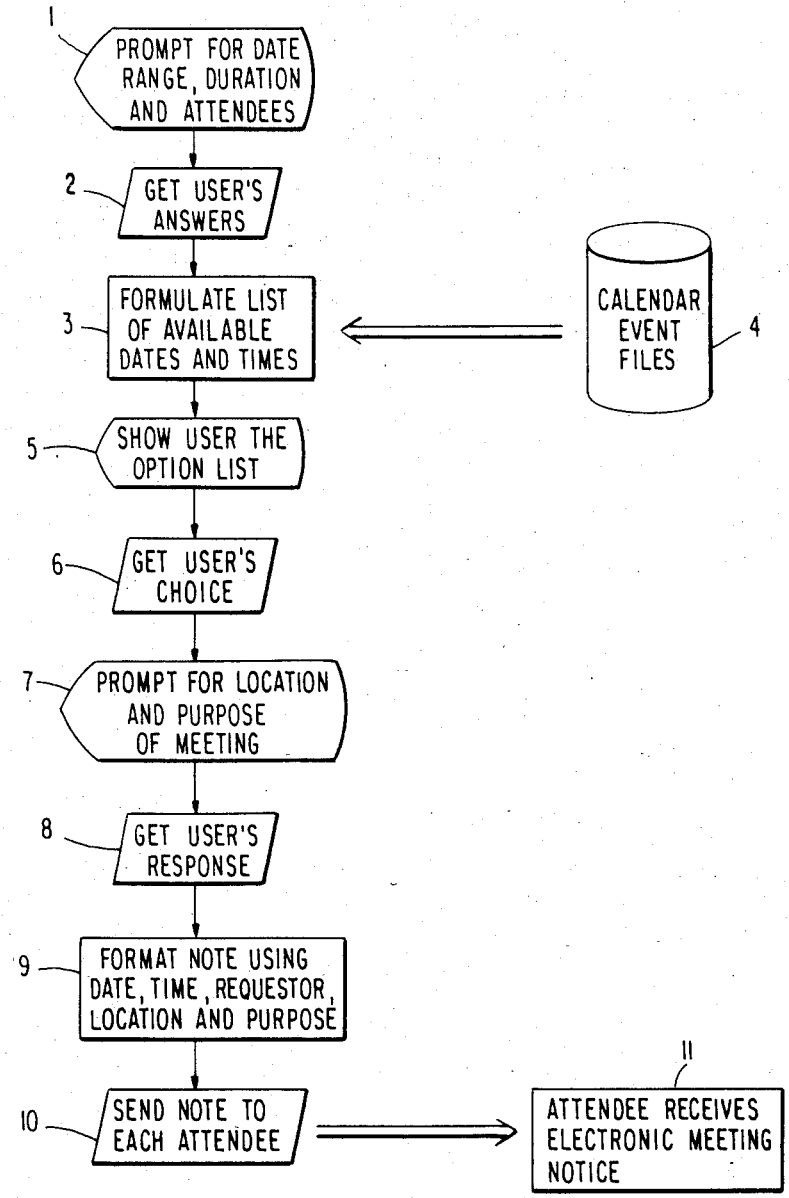
FIG. 4 shows a flow diagram of the software operations performed in scheduling a meeting according to this invention.

For a more detailed understanding of the invention, reference is first made to FIG. 1. In this figure is depicted a prompting screen for scheduling a meeting. This is the initial screen called by, and presented to, a keyboard/display terminal user desiring to schedule the meeting. The user keys in the desired dates between which the meeting is to be scheduled, a minimum amount of time for the meeting, and prospective attendees.

Upon completion of filling in the screen, the user depresses the ENTER key. This causes the contents of the prompting screen to be compared with each attendee's schedule.

The keyboard/display terminals contemplated are connected via phone lines, hard wiring, etc., to a host system having processing, storage, and retrieval capabilities. Configurations of this nature are old and well known in the art, with the most common display being a CRT display. Stored in the host system storage are schedules or calendars of events for the terminal users. These schedules are prepared and changed by each user.

The results of the comparison between the contents of the prompting screen and the attendees' schedules are available dates and meeting times. These are presented to the user as an option list screen shown in FIG. 2. A meeting date and time is selected by keying in a choice on this option screen.

The date and time ranges and spans keyed in by the user on the prompting screen in FIG. 1 are shown on the option screen as a reference. If the user desires to change any of the times found, the prompting screen can be recalled by pressing a programmable function key on the keyboard.

If the option list is too long to display on the user's display screen, programmable function keys can be used for scrolling the list back and forth. To choose a date and time from the list, the user keys an X under the column labeled "CHOICE" next to the date and time desired. If the time interval shown is longer than the user desires, a different starting and/or ending time for the meeting can be keyed in. This is so as long as the time interval is within the original interval shown.

Once the user has made a choice and depressed the ENTER key on the keyboard, a notification screen is called and displayed for prompting the user to key in the location and purpose of the meeting. The notification screen is depicted in FIG. 3. The date, starting time, and ending time chosen by the user on the screen of FIG. 2 is shown to the user on the screen of FIG. 3 as a reference. If a different date and/or time from the list is then desired, a programmable function key can be depressed for recalling, or causing a return to, the screen of FIG. 2. Yet a different programmable function key can be used to restart the entire operation beginning with the screen of FIG. 1. Once the location and/or purpose of the meeting have been keyed in on the screen of FIG. 3, a programmable function key is depressed to send or transmit notification of the meeting to each of the attendees keyed in on the screen shown in FIG. 1.

Reference is next made to FIG. 4, wherein there is illustrated an overview of the program logic which assembles the screens of FIGS. 1, 2 and 3 and processes the keyed in data. First, based on user keying, the prompting screen depicted in FIG. 1 is called as indicated by block 1. Next, data keyed in to the screen of FIG. 1, illustrated by block 2, is used to compile a list of available meeting dates and times as illustrated by block 3. The list of available dates and times is the result of a comparison of a filled in prompting screen with the attendees' calendar event files shown as block 4. The resulting list is displayed to the user as an option list from which a specified meeting time may be chosen. This is indicated by block 5.

Once the user has made a choice upon keying, as depicted by block 6, the program logic assembles and displays to the user the notification screen of FIG. 3. This is represented by block 7. When the user has keyed in the requested data as indicated by block 8, the program logic builds a notification which informs the recipient of the date, time, requester, location, and purpose of the meeting. This building process is performed by the logic indicated by block 9. The notification is transmitted from the host computer to each attendee's display, as indicated by block 10. Block 11 illustrates that each attendee then receives, and views, the meeting notification transmitted by this process.

Figure 5:
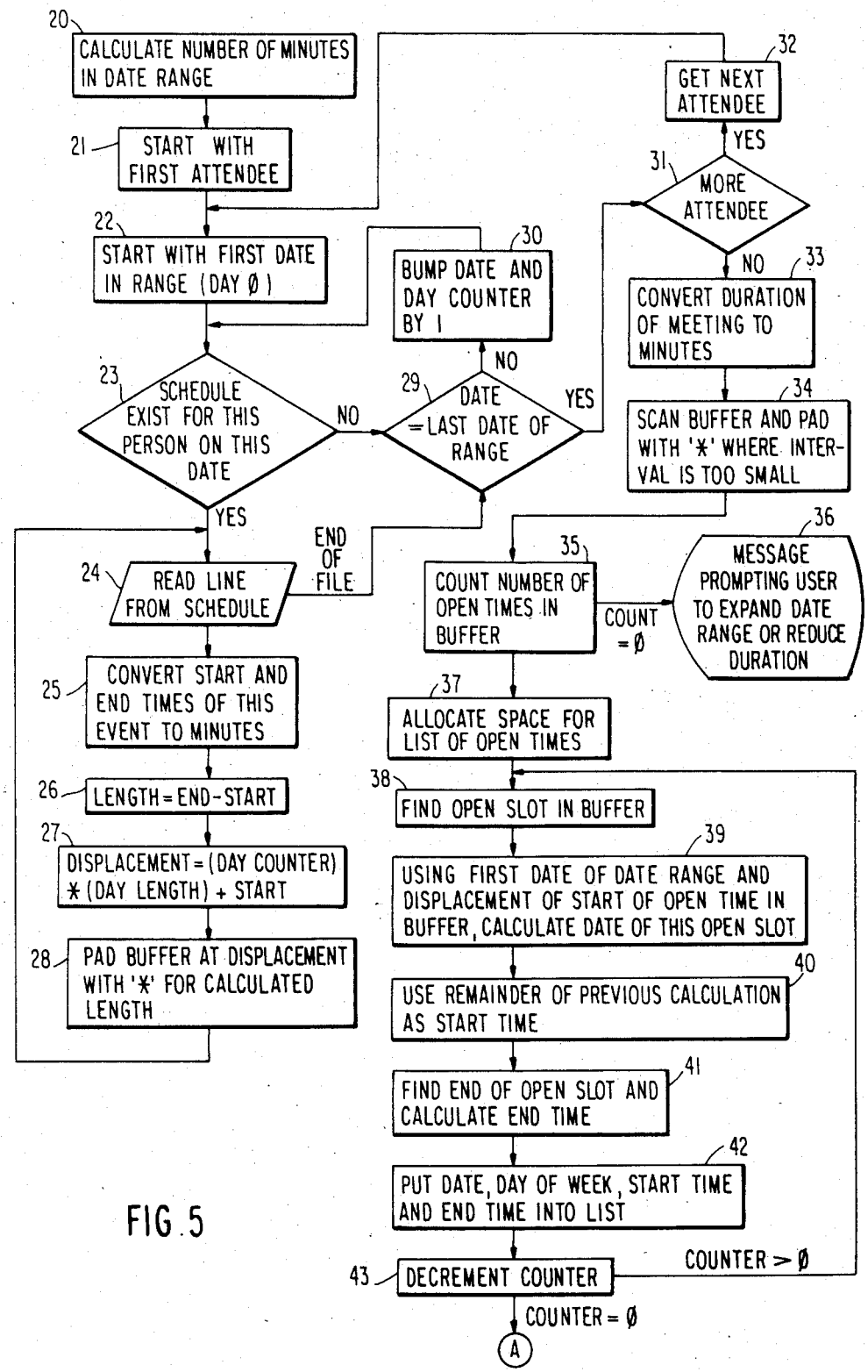
FIGS. 5 and 6 illustrate in greater detail the operations of blocks 3 through 6 of FIG. 4.
Figure 6:
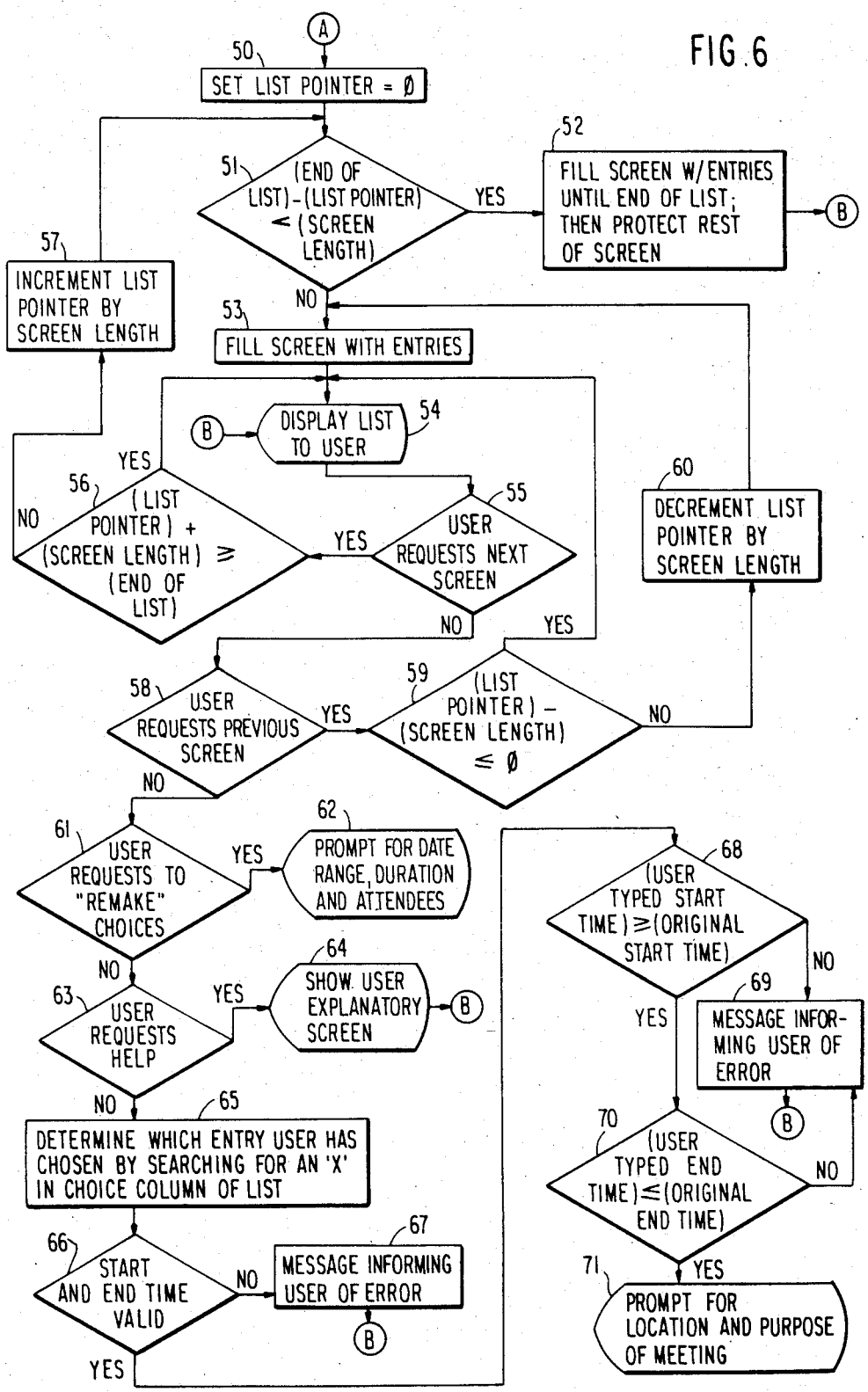

Refer next to FIGS. 5 and 6. These figures illustrate the detail of the operations generally depicted by blocks 3 through 6 of FIG. 4. First, as indicated in block 20, the number of total minutes in the date range keyed in on the screen shown in FIG. 1 is calculated. This is used as the size of a buffer which will be used in building the list of available meeting times. This buffer is initialized with blanks to the size of the buffer. Then, the search is begun using the name of the first attendee keyed in by the user on the screen depicted in FIG. 1. This operation is indicated by block 21. For this attendee, a search is begun with the first date keyed in by the user on the screen in FIG. 1. This operation is illustrated by block 22. A determination is made as to whether any events are scheduled for this attendee on this date. This is performed by logic sequence 23. If there are calendar events for this attendee on this date, a record is read from the schedule, as indicated by block 24. The starting and ending time for the event on the record are converted to minutes. This is indicated by block 25. Then, as illustrated by block 26, the duration of the event is calculated. A displacement into the buffer is calculated using a day counter, the length of a day in minutes, and the starting time of the event in minutes. This calculation is represented by block 27. The buffer is padded, beginning at the displacement calculated by the operation of block 27, with the character "*" for the length calculated in the sequence illustrated by block 26.

When all of the events on this particular schedule have been processed as just described, a determination is made as to whether the date of the schedule just processed is the last date of the range keyed in by the user on the screen of FIG. 1. This determination is performed by logic sequence 29. If it is not the last date, then the date is incremented to the next date in the range, as indicated by block 30, and processing continues at block 23.

When the last date of the range has been processed for this attendee, logic sequence 31 performs a determination as to whether all of the attendees have been processed. If there are more attendees to process, the name of the next attendee is used, as illustrated by block 32, and processing continues beginning with block 22.

When all of the attendees' schedules have been so processed, the duration of the meeting time, as keyed in by the user on the screen depicted in FIG. 1, is converted to minutes. This is indicated by block 33. The buffer is scanned, and padded with the character "*" wherever the interval of blanks is smaller than the duration requested. This operation is represented by block 34.

A count of the number of open times in the buffer is then made by the logic sequence represented by block 35. If result of the count is 0, then there are no times that satisfy the requirements keyed in by the user on the screen of FIG. 1. In this case, the screen of FIG. 1 is re-displayed to the user, with a message suggesting either (1) a reduction in the amount of time for the meeting, or (2) an expansion in the date range. This process is indicated by block 36. The user may then change any portion of the search criteria, including attendees, and the search will be performed again.

If the count of the number of open times in the buffer is not 0, then there is an allocation of the amount of space needed to build the list of open times to be displayed to the user as shown in FIG. 2. This is indicated by block 37. Then, the buffer is scanned for an open time, as illustrated by block 38. Block 39 represents the operation of calculating the date of the open time found. Used is the first date of the date range keyed in by the user on the screen of FIG. 1, and the displacement of the start of the open time in the buffer. The remainder from the calculation of block 39 is used to calculate the starting time of the open time found. This is represented by block 40. A scan is then performed, as indicated by block 41, to find the end of the open time, and the end time of the open time is calculated. The results of the calculations performed by blocks 39 through 41 are used to insert the date, day of the week, starting time and ending time for this open time into the list which will be displayed to the user on the screen of FIG. 2. This operation is represented by block 42. As indicated by block 43, the count of the number of open times in the buffer in then decremented. If it is not zero, indicating that there are more open times in the buffer, processing continues beginning with block 38.

Next refer to the second part of the detailed program logic which is shown in FIG. 6. When all of the open times in the buffer have been built into the list, a list pointer is initialized, as indicated by block 50. Next, a determination is made by logic sequence 51 as to whether the number of entries from the list pointer to the end of the list is too large to display on a single screen. The single screen is that shown in FIG. 2. If the list will fit on a single screen, the screen shown in FIG. 2 is filled with the remainder of the entries in the list, and any lines remaining on the screen are set to be protected. This is so the user can not key in an "X" on a line where there is no list entry. This is illustrated by block 52. If there are too many entries to fit on a single screen, then, as indicated by block 53, the screen of FIG. 2 is filled with as many list entries as possible.

Once the screen has been thus built with list entries, it is displayed to the user. This is indicated by block 54. Next, a series of logic sequences are performed to determine what the user has requested. Logic sequence 55 determines whether the user has requested a display of the next screen of entries. If so, a determination is made by logic sequence 56 as to whether the screen currently being displayed shows the user the last list entry. If there is not another screen of entries to display to the user, the same screen is re-displayed, and processing continues at block 54. If there are more entries to show the user, the list pointer is incremented by the number of entries which can be displayed on a single screen, as indicated by block 57, and processing continues beginning with logic sequence 51.

The processing for the user's request for the previous screen is very similar. If it is determined by logic sequence 58 that the user has requested to view the previous screen of list entries, a determination is performed by logic sequence 59 as to whether the user is currently viewing the first screen of entries. If so, the screen is re-displayed, and processing continues at block 54. If there is a screen of previous entries, then the list pointer is decremented by the number of list entries that will fit on the screen. This is indicated by block 60, and processing continues at block 53.

If the user has requested neither to view the next, nor the previous screen of list entries, a determination is made as to whether the user has requested to restart the search. This is performed by logic sequence 61. If the programmable function key associated with this request is depressed, the screen of FIG. 1 is re-displayed for a change in keyed-in data, and to start the search again. This is indicated by block 62. If this is not requested, logic sequence 63 determines whether the user has requested assistance in making a choice on the screen of FIG. 2. If this is requested, a screen of information is displayed explaining the use of the screen in FIG. 2. This is represented by block 64. Once this explanatory information has been read, processing continues at block 54.

If none of the alternatives discussed in the previous paragraph corresponded to the user's request, then a determination is made as to which entry the user has chosen from the list. This process, represented by block 65, scans the "CHOICE" column of the list entries until it finds where the user has keyed in an "X". Logic sequence 66 is used to determine if the user has keyed in invalid times under the "STARTING" or "ENDING" columns for the chosen entry. Keying here would be to reduce the duration of the meeting. If the times are not valid, the user is informed of the error, as indicated by block 67, and processing continues at block 54. If the times are valid, logic sequence 68 determines whether the user has keyed in a time under the "STARTING" column for the chosen entry that is earlier than the original starting time shown for this entry. If it is before the original time, a message is shown to the user indicating an error, as illustrated by block 69, and processing continues at block 54. Otherwise, a determination is performed by logic sequence 70 as to whether the user keyed in a time under the "ENDING" column for the chosen entry that is later than the original ending time shown for this entry. If so, the same operations as described for an earlier time are performed. The user is informed of the error, as indicated by block 69, and processing continues at block 54.

If the times are within the proper range, the user is prompted for the location and purpose of the meeting, as indicated by block 71. Reference is again made to FIG. 3 for a representation of the notification screen which includes prompts.

In summary, a unique method of scheduling a meeting among keyboard/display terminal users is provided in order to impart flexibility to the process of, and reduce the time normally expended in, arranging a meeting and notifying attendees.

The method utilizes users' daily schedules which are built by keying in a date, a start time, an end time, and information related to the keyed in time such as an event description. The daily schedules are called as screens by the users to remind them of coming events. First included in the method is presentation of a prompting screen to a user desiring to schedule a meeting. The screen includes blanks to be filled in by keying. To be keyed in the blanks are a range of acceptable dates, a meeting time duration preference, and prospective attendees. Upon completion of keying, the screen contents are compared with the prospective attendees' daily schedules. This comparison is to ascertain times when all prospective attendees have no scheduled event. As a result of the comparison, a list of available times and dates for the meeting is compiled. The list is presented the user as a number of options from which a time can be selected.

Once an appropriate date and time have been chosen from the option list, a notification screen is presented to the user scheduling the meeting, prompting the user to key in the location and purpose of the meeting. Thereafter, a meeting notification, listing date, time, location, purpose, and scheduler, is transmitted and displayed to each attendee.

While the invention has been particularly shown and described with reference to a preferred embodiment, it will be understood by those skilled in the art that various changes in form and detail may be made without departing from the spirit and scope of the invention.

We claim:

1. A method of scheduling a meeting using attendee calendars stored in a computer system, said method comprising:
   (a) presenting a scheduler with a prompting screen for keying in prospective attendees and desired date range and time span for a meeting;
   (b) comparing in said computer system said date range and time span with said attendee calendars; and
   (c) presenting an option screen to said scheduler, displaying available times for selection of a meeting time.

2. A method according to claim 1 wherein said step of presenting a prompting screen includes presenting a screen for keying in a place for said meeting and said step of comparing includes comparing said date range and time span with a calendar for said place.

3. A method according to claim 1 wherein said step of presenting an option screen includes providing an ability to select an exact meeting time.

4. A method according to claim 3 including notifying each attendee of said meeting.

5. A method according to claim 4 including presenting a notification screen to said scheduler for keying in a purpose of said meeting, said step of notifying including notifying each attendee of the purpose of said meeting.

6. A method according to claim 1 including presenting a notification screen to said attendees with dates and time filled in from said option screen based on selection from said option screen.

* * * * *

UNITED STATES PATENT AND TRADEMARK OFFICE
CERTIFICATE OF CORRECTION

PATENT NO. : 4,626,836

DATED : December 2, 1986

INVENTOR(S) : Donald E. Curtis et al

It is certified that error appears in the above—identified patent and that said Letters Patent is hereby corrected as shown below:

Column 1, line 9, "548,609" should read --548,608--.

Signed and Sealed this

Sixteenth Day of May, 1989

Attest:

DONALD J. QUIGG

*Attesting Officer*    *Commissioner of Patents and Trademarks*